UNITED STATES PATENT OFFICE.

CARL V. PETRAEUS, OF PHILADELPHIA, PENNSYLVANIA.

MANUFACTURE OF POROUS ZINCIFEROUS ALUM.

SPECIFICATION forming part of Letters Patent No. 269,957, dated January 2, 1883.

Application filed August 21, 1882. (No specimens.)

*To all whom it may concern:*

Be it known that I, CARL V. PETRAEUS, of the city and county of Philadelphia, State of Pennsylvania, have invented a new and useful Improvement in the Manufacture of Porous Zinciferous Alum, of which the following is the description.

Porous alum of commerce is a sulphate of alumina, rendered porous by adding to sulphate of alumina, molten in its water of crystallization, any salts of an alkali or an alkaline earth that evolve gases by the combined action of heat and sulphate of alumina; also by the rapid injection of air, steam, or vapor of water or other gaseous body into the mass of dissolved sulphate of alumina. Pieces of zinc have been introduced into ferruginous solutions of alum, not for the purpose of rendering it porous, but merely to convert the ferric oxide ($Fe_2O_3$) into ferrous oxide, (FeO,) and thus produce an aluminous cake free from color. Such a process is described by Francis Laur in the reissue of Letters Patent of the United States, No. 9,340, dated August 10, 1880. I have, however, discovered that a porous zinciferous alum can be produced by the action of carbonate of zinc upon molten sulphate of alumina, and that by my process a product is obtained of greater value as a sizing matter for paper-making than the porous alum heretofore used for that purpose. Sulphate of alumina is made by decomposing bauxite, clay, or other aluminous material with sulphuric acid and separating the soluble sulphate of alumina from the insoluble silex and undecomposed matter by dissolving the sulphate of alumina in water and drawing off the clear solution from the sediment. Sulphate of alumina is also made from artificial alumina obtained from cryolite and bauxite by mixing together the alumina and strong sulphuric acid. When alumina and strong sulphuric acid are mixed together the heat generated is so great that the sulphate of alumina formed melts in its water of crystallization, and upon cooling there is formed a hard amorphous cake, very difficult to dissolve in water. A hard cake is also produced when the solution of sulphate of alumina is evaporated to sufficient concentration, (50° or 60° Baumé.)

The object of my process is to produce a porous zinciferous alum of superior quality as a sizing material.

My process is not confined to ferruginous aluminous solutions, and it will not produce the effect obtained by the process of Francis Laur, above referred to, of converting ferruginous aluminous solutions into colorless aluminous cake.

The manner in which I work my process is, as follows: After the molten sulphate of alumina has cooled down so that it begins to thicken I sprinkle carbonate of zinc on the mass and stir it up, and then run the mass into cooling-pans, where it is allowed to cool. The carbonic acid evolved by the action of the heat and sulphate of alumina upon the carbonate of zinc renders the mass porous, while oxide of zinc combines with parts of the sulphuric acid and renders the product less acid toward ultramarine-blue and other colors used in paper-making, and the zinc largely increases the sizing quality of the alum, since oxide of zinc is equal to alumina as a sizing material. The quantity of carbonate of zinc required in working my process is very small. Some three to four pounds for each one thousand pounds of alum are sufficient; but I prefer to use more, as the alum, especially when made from clay, often contains free sulphuric acid; still three to five per centum are generally sufficient. As carbonate of zinc of tolerable purity is often found in nature, I have found that I can use this in a finely-powdered state. However, since it is not perfectly pure, I prefer first to neutralize the acid with the native carbonate of zinc before concentrating the alum solution, and then rendering the alum porous by artificial carbonate of zinc.

Having described my invention, what I claim, and desire to secure by Letters Patent of the United States, is—

The process of manufacturing porous zinciferous alum by treating sulphate of alumina, molten in its water of crystallization, to the action of carbonate of zinc, substantially as described.

In testimony whereof I have hereunto signed my name this the 19th day of August, A. D. 1882.

C. V. PETRAEUS.

In presence of—
JOHN G. LAMB,
HENRY V. MASSEY.